United States Patent [19]
Seifert, Jr.

[11] 3,784,229
[45] Jan. 8, 1974

[54] TORQUE HINGE FOR DRAFT MEMBER

[76] Inventor: Edwin A. Seifert, Jr., Route 1, Belgrade, Mont. 59714

[22] Filed: May 23, 1972

[21] Appl. No.: 256,129

[52] U.S. Cl. .............................. 280/446 R, 172/677
[51] Int. Cl. ............................................. B60d 1/06
[58] Field of Search ............ 280/446, 405 R, 405 B; 172/677

[56] References Cited
UNITED STATES PATENTS

| 3,032,903 | 5/1962 | Ede | 280/446 X |
| 3,580,612 | 5/1971 | Pearson | 280/446 X |
| 3,275,341 | 9/1966 | Ralston | 172/677 X |
| 2,480,387 | 8/1949 | Smith | 280/405 X |

Primary Examiner—Leo Friaglia
Assistant Examiner—Randall A. Schrecengost
Attorney—Clarence A. O'Brien and Harvey B. Jacobson

[57] ABSTRACT

A hinge connection between a draft implement and its towing tongue allowing the forward end of the tongue to swing up and down about a horizontal transverse axis relative to the draft implement. The hinge connection further includes structural features whereby increasing downward forces are applied to the front end of the tongue in response to increasing forward pulling forces on the draft implement by the towing tongue.

5 Claims, 4 Drawing Figures

PATENTED JAN 8 1974　　　　　　　　　　　　　3,784,229

TORQUE HINGE FOR DRAFT MEMBER

The torque hinge of the instant invention has been designed primarily to enable increasing amounts of the weight of the forward end of a draft implement to be applied to the forward end of the associated towing tongue in response to increases in forward pulling force on the draft implement by the tongue. In this manner when increased resistance to forward movement of the draft implement is encountered additional downward forces on the rear driving wheels of the towing vehicle are applied thereby affording the towing vehicle additional traction. Further, the additional downward forces on the towing tongue front end are applied by downward swinging movement of the front end of the towing tongue relative to the draft implement thereby raising the forward portion of the draft implement relative to the portion of the towing vehicle to which the towing tongue is secured and by this operation the operating depth of a ground working tool carried by the draft implement is reduced so as to effect a reduction in the resistance to forward movement of the draft implement.

The main object of this invention is to provide a hinge connection between a draft implement and its associated towing tongue which will, in response to increases in the resistance to forward movement of the draft implement resulting in the forward end of the towing tongue being swung downwardly relative to the draft implement so as to apply a downward thrust on the rear driving wheels of the associated vehicle.

Another object of this invention, in accordance with the immediately preceding object, is to provide a hinge construction which will be operative to raise the forward end of the associated draft implement in relation to the point of the towing vehicle to which the draft tongue is secured in response to increases in resistance to forward movement of the draft implement so as to thereby reduce the operating depth of ground-working elements carried by the draft implement.

A still further object of this invention is to provide a torque hinge in accordance with the preceding objects that may be readily incorporated into existing draft implements and also implements presently being manufactured.

A final object of this invention to be specifically enumerated herein is to provide a torque hinge in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
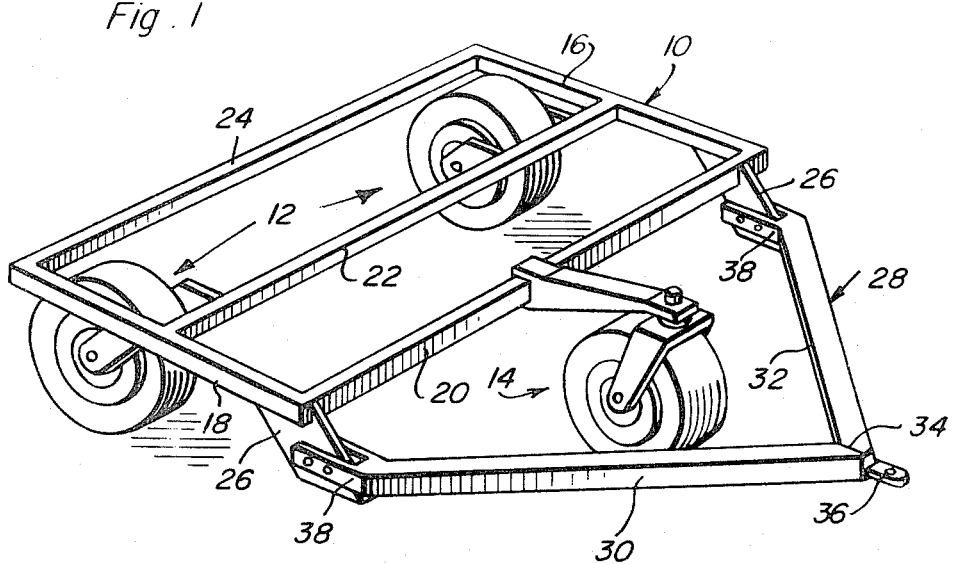
FIG. 1 is a perspective view of a conventional form of draft implement wheeled support frame provided with a towing tongue coupled to the implement frame by means of the torque hinge of the instant invention.

Referring now more specifically to the drawings, the numeral 10 generally designates a draft implement frame of conventional design including opposite side rear ground-engaging support wheel assemblies 12 and a forward dirigible type ground-engaging support wheel assembly referred to in general by the reference numeral 14. The frame 10 includes opposite side members 16 and 18 between which front, rear and intermediate cross members 20, 22 and 24, respectively, extend. The wheel assembly 14 is supported from the front transverse member 20 and the wheel assemblies 12 are supported from the intermediate transverse member 22. The wheel assemblies 12 may be vertically adjustable and the forward corner portions of the frame 10 include forwardly and downwardly inclined heavy duty anchor plates 26 which are disposed in vertical planes extending longitudinally of the frame 10.

A towing tongue is referred to in general by the reference numeral 28 and includes a pair of opposite side towing arms 30 and 32 convergent toward their forward ends and joined together as at 34. The forward extremity of the towing tongue 28 includes a hitch element 36 for attachment to a towing vehicle and the rear ends of the arms 30 and 32 include bifurcated portions 38 which extend longitudinally of the frame 10 and parallel each other. The bifurcated portions 38 include transversely spaced furcations 40 having aligned horizontal transverse bores 42 formed therein. Each pair of furcations 40 embracingly receives the corresponding anchor plate 26 therebetween and each anchor plate 26 includes a pair of arcuate slots 44 and 46 extending along circumferentially spaced segments of the circumference of a circle having the point 48 as its center of curvature. The slots 44 and 46 are disposed to the rear and in front of, respectively, the points 48 and are substantially entirely disposed above a horizontal plane containing an axis extending between the points 48.

A camming pin 50, having a central bearing sleeve 51 journaled thereon, is secured through each pair of bores 42 with the sleeves 51 at each side of the frame 10 being rollingly disposed in the corresponding slots 44 and 46. In this manner, the bifurcated end portions 38 of the arms 30 and 32 are secured to the anchor plate 26. When the tongue 28 is substantially horizontally disposed, the camming pins 50 are each disposed generally centrally intermediate the opposite ends of the corresponding slot.

Figure 2:
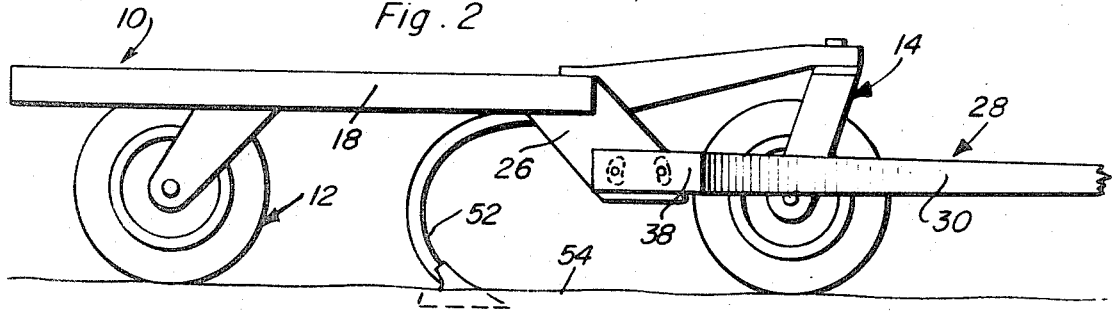
FIG. 2 is an enlarged side elevational view of the assemblage illustrated in FIG. 1 and with a ground-working element carried by the implement frame.
Figure 3:
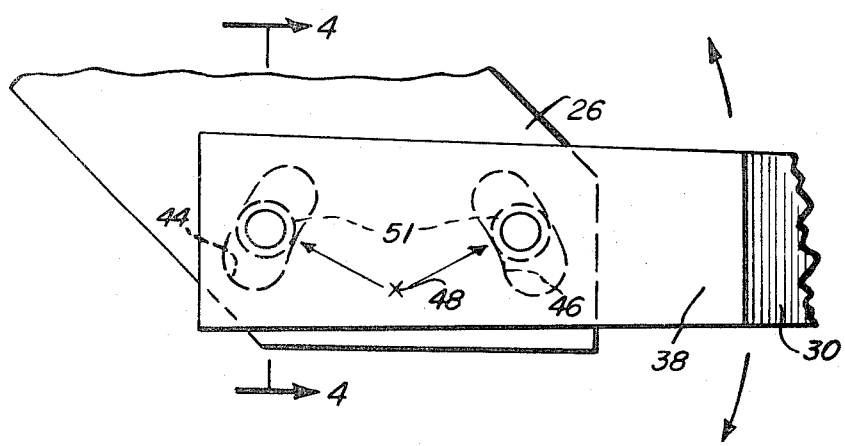
FIG. 3 is a fragmentary side elevational view of one side portion of the torque hinge connection of the instant invention and the adjacent portions of the draft implement frame and towing tongue associated therewith.
Figure 4:
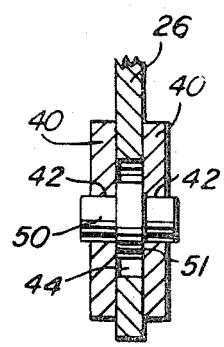
FIG. 4 is a fragmentary transverse vertical sectional view taken substantially upon the plane indicated by the section line 4—4 of FIG. 3.

In FIG. 2 of the drawings a ground-working element 52 is dependingly supported from the front transverse member 20 and engaged with the ground 54 upon which the wheel assemblies 12 and 14 rest. The working depth of the element 52 is predetermined according to its position in relation to the lower peripheral portions of the wheel assemblies 12 and 14.

When the towing tongue 28 is secured to a draft vehicle (not shown) and forward movement of the frame 10 meets with increasing resistance to movement of the element 52 through the ground 54, the additional forward pull on the frame 10 by the tongue 28 necessary to maintain forward movement of the frame 10 causes the forward pins 50 to be cammed downwardly in the slots 46 and the rear pins 50 to be cammed upwardly in the slots 44. This of course swings the forward end of the tongue 28 downwardly relative to the frame 10. However, inasmuch as the forward end of the tongue 28 is attached to the associated towing vehicle (not shown) at a fixed elevation relative to that vehicle, instead of the forward end of the tongue 28 being urged downwardly, the forward end of the frame 10 is cammed upwardly so as to transfer some of the weight of the forward end of the frame 10 ordinarily supported by the wheel assembly 14 to the forward end of the tongue 28 thereby affording the rear traction wheels of the towing vehicle (not shown) greater traction. In addition, upward swinging movement of the forward end of the frame 10 serves to counter the tendency for ground resistance acting upon the element 52 to cause the forward end of the frame to drop and reduces the operating depth of the ground-working element 52 so as to prevent the wheel assembly 14 from being urged downwardly into the ground 54, thus reducing resistance to forward movement of the frame 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a draft implement frame including front and rear portions, an elongated tongue, coacting means supporting one end portion of said tongue from said front portion of said frame with said tongue projecting generally horizontally forwardly of said frame, said coacting means including means supporting said tongue from said frame for relative angular displacement of the tongue to raise and lower the front end thereof relative to the frame, said coacting means including means operative to apply increasing downward forces on the forward end of the tongue in response to increasing forward pulling force on said frame by said tongue, said coacting means defining a pair of front and rear pin and slot connections between said frame and tongue spaced longitudinally of the latter and in generally horizontal alignment with each other, the slot portion of one of said pin and slot connections comprising an upstanding arcuate slot with its concave side opening toward the other slot and including a portion thereof opening in a slightly downwardly inclined direction in which the pin portion of said one pin and slot connection is disposed when said elongated tongue is generally horizontally disposed.

2. In combination, a draft implement frame including front and rear portions, an elongated tongue, coacting means supporting one end portion of said tongue from said front portion of said frame with said tongue projecting generally horizontally forwardly of said frame, said coacting means including means supporting said tongue from said frame for relative angular displacement of the tongue to raise and lower the front end thereof relative to the frame, said coacting means including means operative to apply increasing downward forces on the forward end of the tongue in response to increasing forward pulling forces on said frame by said tongue, said coacting means including means supporting said tongue from said frame for angular displacement about a generally horizontal axis extending transversely of said frame, said coacting means defining a pair of front and rear pin and slot connections between said frame and tongue spaced longitudinally of the latter and in generally horizontal alignment with each other, the slot portions of said pin and slot connections being arcuate and having said axis as their centers of curvature, said pins being disposed above a horizontal plane containing said axis.

3. The combination of claim 2 wherein said slot portions are at least substantially entirely disposed above a horizontal plane containing said axis and said slot portions of said pin and slot connections are disposed on opposite sides of a vertical transverse plane containing said axis.

4. In combination, a claim 4 implement frame including front and rear portions, an elongated tongue, coacting means supporting one end portion of said tongue from said front portion of said frame with said tongue projecting generally horizontally forwardly of said frame, said coacting means including means supporting said tongue from said frame for relative angular displacement of the tongue to raise and lower the front end thereof relative to the frame, said coacting means including means operative to apply increasing downward forces on the forward end of the tongue in response to increasing forward pulling forces on said frame by said tongue, opposite side forward portions of said frame including upstanding parallel longitudinally extending plate portions, said tongue including rearwardly divergent arms joined together at their forward ends, the rear ends of said arms including bifurcated portions receiving the corresponding plate portions between the furcations thereof, said plate portions each including a pair of arcuate slots disposed on opposite sides of a vertical transverse plane containing a horizontal transverse axis, said slots being disposed substantially entirely above a horizontal plane containing said axis, said slots having said axis as their centers of curvature, each pair of furcations having a pair of camming pins secured therethrough and extending therebetween with said pins snugly and slidingly received in the corresponding slots, the opposing portions of said pins and the walls of said slots comprising said coacting means.

5. The combination of claim4 wherein said pins, when said tongue is generally horizontally disposed, are disposed generally centrally intermediate the opposite ends of said slots.

* * * * *